Patented Oct. 25, 1949

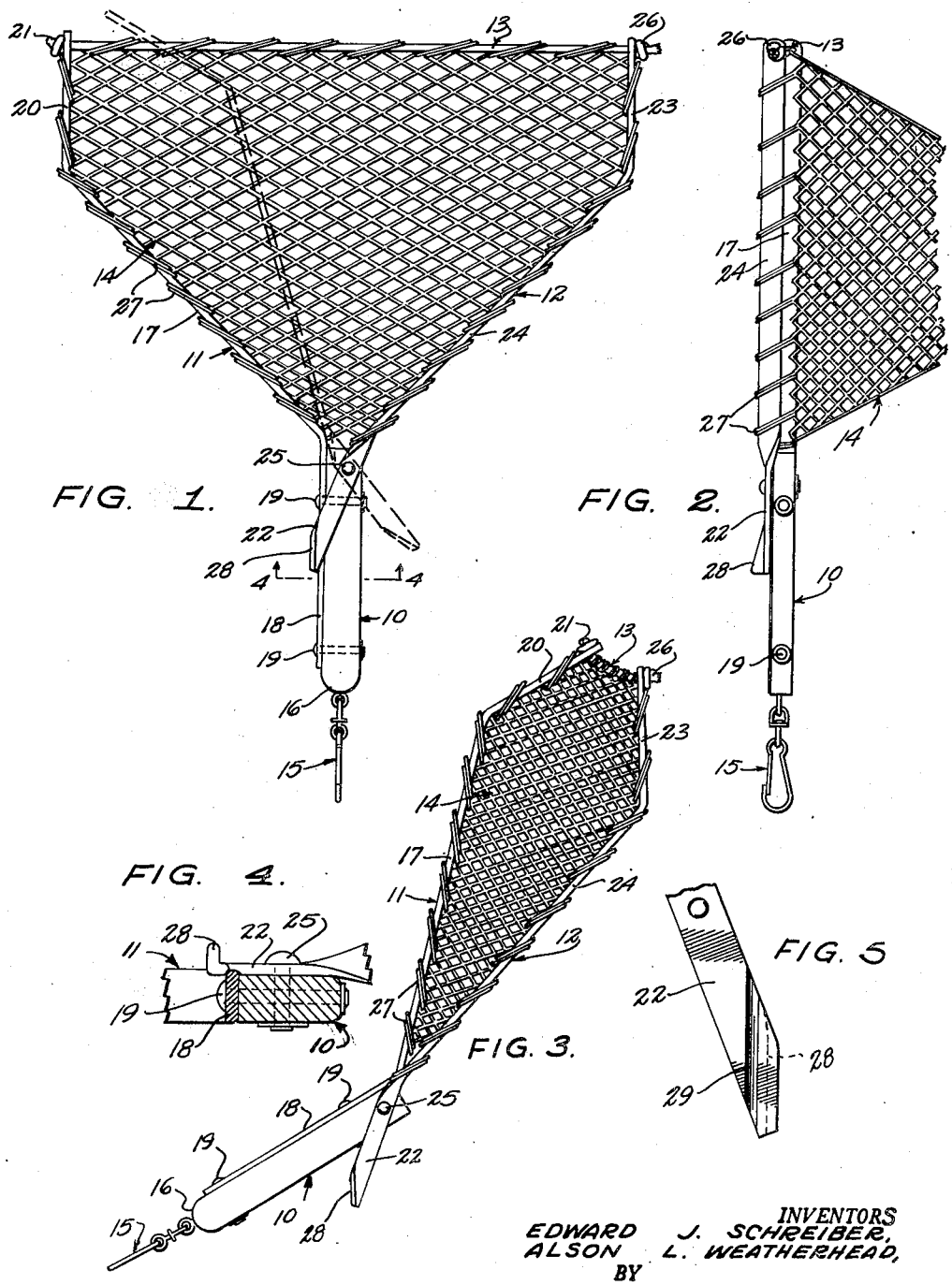

2,485,781

UNITED STATES PATENT OFFICE 2,485,781

COLLAPSIBLE FISH LANDING NET

Edward J. Schreiber and Alson L. Weatherhead, Willimantic, Conn.

Application June 18, 1948, Serial No. 33,844

4 Claims. (Cl. 43—12)

This invention relates to fish landing nets and more particularly to a collapsible net which may be folded up for ease in transportation.

It is among the objects of the invention to provide an improved fish landing net of simplified construction having a minimum number of simple parts, which net folds automatically into a compact form when not in use and is easily held and unfolded or expanded by one hand when in use, which will not fold or collapse until manually released, which may be attached to the clothing of the user so that it cannot be lost or mislaid, which, when expanded, is of ample size for the intended purpose, and which is economical to manufacture, durable in use, of extremely light weight and neat and attractive in appearance.

Other objects and advantages will become apparent from a consideration of the following description and the appended claims in conjunction with the accompanying drawings wherein:

Figure 1 is a top plan view of a net illustrative of the invention in expanded or unfolded position;

Figure 2 is a side elevation of the net illustrated in Figure 1;

Figure 3 is a top plan view of the net in folded or collapsed position;

Figure 4 is a transverse cross section on an enlarged scale taken substantially on the line 4—4 of Figure 1; and Figure 5 is a plan view of a fargmentary portion of the net showing a structural detail.

With continued reference to the drawing, the net comprises, in general, a handle 10, a frame side arm 11 rigidly secured to the handle, a frame side arm 12 pivotally secured to the handle, a stretchable, resilient strand 13 interconnected between the ends of the arms 11 and 12 remote from the handle 10, a net 14 secured at its edges to the frame side arms 10 and 11 and the flexible strand 13, and a hook 15 swivelly connected to the end of the handle opposite the end from which the frame side arms 10 and 11 extend, for attaching the landing net to the clothing of a person using the net.

The handle 10 is an elongated body of wood or other suitable material, having straight, substantially parallel side edges, one square end, and a rounded end 16 to which the hook 15 is swivelly attached.

The frame side arm 11 is formed of a bar of suitable metal, such as steel and has a flat, rectangular cross sectional shape and substantially straight end portions disposed in spaced apart, substantially parallel planes, with an intermediate portion 17 interconnecting said end portions and inclined relative thereto. The longer end portion 18 lies along one side edge of the handle 10 and has a length substantially equal to the length of the handle. This end portion is provided with spaced apart apertures which receive respective rivets 19 which rivets also extend through transverse apertures provided in the handle to secure the frame side arm 11 rigidly to the handle. The outer end portion 20 of the frame side arm 11 is provided near its outer end with an aperture through which the strand 13 extends, the end of the strand being knotted, as indicated at 21, at the outer side of the arm so that it cannot be pulled through the aperture from the inner side of the frame arm.

The arm 11 extends outwardly from the square end of the handle and diverges outwardly away from the longitudinal center line of the handle, as clearly illustrated in Figures 1 and 3.

The frame side arm 12 is of substantially the same shape as the arm 11 and has two substantially straight end portions 22 and 23 connected by a straight intermediate portion 24 which is inclined relative to both of the end portions. The end portion 22 of arm 12 is twisted to a position at right angles to the corresponding intermediate portion 24 and is provided near the corresponding end of the intermediate portion with an aperture through which a suitable pivot pin, provided as a rivet 25, extends to pivotally secure the arm 12 to the handle 10 near the end of the handle from which the arms extend. The outer end portion 23 of frame arm 12 is provided near its outer end with an aperture through which the corresponding end of the flexible strand 13 extends, the strand being knotted at the outer sides of the frame arm, as indicated at 26, so that it cannot be pulled inwardly through the arm.

The net 14 is secured along its edges to the frame side arms 11 and 12 and the flexible strand 13 by a suitable lacing cord 27 and is collapsible and expandible as the frame arm 12 is swung toward and away from the opposed frame arm 11.

The frame arm 12 is provided on its end adjacent the pivot pin 25 with an upstanding thumb rest 28 which may be conveniently provided by diagonally bending up an outer corner of the end portion 22 of this frame arm.

With this arrangement and with the handle gripped in the hand of a user, sufficient pressure may be applied by the thumb of the same hand against the thumb rest 28 to swing the pivoted frame arm 12 about the pivot pin 25 from the net collapsing position, illustrated in Figure 3 and indicated in broken lines in Figure 1, to its net expanding position, illustrated in full lines in Figure 1. When the thumb pressure on thumb rest 28 is released the stretchable, flexible strand 13 tends to move the pivoted arm 12 toward the rigidly secured arm 11 in a net collapsing direction. This effort of the flexible strand however is restrained by frictional engagement of the end portion 22 of the arm 12 with the end portion 18 of the arm 11 until this frictional engagement is manually released.

The surface of the end portion 22 of arm 11 opposite the surface from which the thumb rest 28 extends is provided with a diagonal groove 29, as clearly illustrated in Figure 5. The end portion 18 of arm 11 has its edge adjacent the side of the handle 10 upon which the arm 12 is pivotally mounted extending slightly above the corresponding surface of the handle so that this upper edge of the end portion 18 of arm 11 engages in the grooves 29 of arm 12 when arm 12 is moved completely to its net expanding position, this frictional engagement between arms 11 and 12 being illustrated in detail in Figure 4. When it is desired to collapse the net a slight upward pressure is applied to the outer end of the portion 22 of arm 12 to release the corresponding edge of the portion 18 of arm 11 from the groove 29 whereupon the stretchable strand 13 will contract, moving the pivotally mounted arm 12 from the full line position illustrated in Figure 1 to the position illustrated in Figure 3.

The net is of small size, convenient to handle in landing fish in fly casting fishing, and the handle is of a length and size to provide a convenient and comfortable grip. The distance between the pivot pin 25 and the thumb rest 28 of arm 12 is sufficient to provide ample leverage for swinging arm 12 against the force of flexible strand 13 from the net collapsing to the net expanding position of the pivotally mounted arm.

When the landing net is collapsed, as illustrated in Figure 3, it provides a small compact package which is easy to carry in position suspended from the clothing of the fisherman without interfering with the movements of the fisherman or tending to catch in brush and other obstructions through which the fisherman must pass and, when expanded, is of ample size for the purpose intended. When the frame is completely expanded the net 14 is of substantially triangular shape and has a wide, substantially straight outer end, which may be easily inserted under a fish and the flexible strand at the outer end of the net greatly facilitates this operation as it will pass easily over rocks or other obstructions which may be encountered in the act of getting a hooked fish into the landing net.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A fish landing net comprising a handle having substantially parallel side edges, a side frame arm having end portions disposed in spaced apart, substantially parallel planes and an intermediate portion inclined relative to both end portions, one of said end portions being rigidly secured to said handle along one side edge of the latter so that said arm extends from one end of said handle and said intermediate portion diverges outwardly away from the center line of said handle, a second side frame arm having end portions and an intermediate portion inclined relative to both end portions, means adjacent one end of said second arm pivotally connecting said second arm to said handle near said one end of the latter so that said second arm diverges outwardly away from said first-mentioned arm, a stretchable resilient strand connected between the ends of said arms remote from said handle, a net secured at its edges to said arms and said strand, and an upstanding thumb rest on said one end of said second arm for moving said second arm away from said first-mentioned arm to stretch said strand and expand said net, said second arm frictionally engaging said first-mentioned arm adjacent the means pivotally connecting said second arm to said handle to hold said net expanded until manually released.

2. A collapsible fish landing net comprising a handle, a pair of side frame arms, one arm rigidly secured and the other arm pivotally secured to said handle near corresponding ends and extending outwardly from said handle, said arms diverging from said handle away from each other, a thumb rest on said pivotally secured arm for swinging it away from said rigidly secured arm, a stretchable resilient strand connected between the ends of said arms remote from said handle to resiliently urge said pivotally secured arm toward said rigidly secured arm, and a net connected at its edges to said arms and said strand.

3. A collapsible fish landing net comprising a handle, a pair of side frame arms, one arm rigidly secured and the other arm pivotally secured to said handle near corresponding ends and extending outwardly from said handle, said arms diverging from said handle away from each other, a thumb rest on said pivotally secured arm, a stretchable resilient strand connected between the ends of said arms remote from said handle to resiliently urge said pivotally secured arm toward said rigidly secured arm, and a net connected at its edges to said arms and said strand, said pivotally secured arm being movable away from said rigidly secured arm to net expanding position by manual pressure on said thumb rest and frictionally engaging said one arm to hold said net in expanded position.

4. A collapsible fish landing net comprising a handle, a pair of side frame arms, one arm rigidly secured and the other arm pivotally secured to said handle near corresponding ends and extending outwardly from said handle, said arms diverging from said handle away from each other, a thumb rest on said pivotally secured arm for swinging it away from said rigidly secured arm, a stretchable resilient strand connected between the ends of said arms remote from said handle to resiliently urge said pivotally secured arm toward said rigidly secured arm, and a net connected at its edges to said arms and said strand, said arms comprising elongated bars of flat, rectangular, cross-sectional shape with substantially parallel front end portions and converging rear end portions, each arm having a substantially straight intermediate portion inclined relative to both end portions thereof, and said last-mentioned end portions having different angular relations, respectively, to their intermediate portions.

EDWARD J. SCHREIBER.
ALSON L. WEATHERHEAD.

REFERENCES CITED

The following references are of record in the file of this patent:

UNITED STATES PATENTS

| Number | Name | Date |
|---|---|---|
| 959,555 | Koberstein | May 31, 1910 |
| 1,149,060 | Ingram | Aug. 3, 1915 |
| 1,184,466 | Loomis et al. | May 23, 1916 |